United States Patent
Chen

(10) Patent No.: US 10,434,596 B2
(45) Date of Patent: Oct. 8, 2019

(54) PROJECTION WELDING ELECTRODE WITH REPLACEABLE ELECTRODE ELEMENT

(76) Inventor: Jiayuan Chen, Windsor (CA)

( * ) Notice: Subject to any disclaimer, the term of this patent is extended or adjusted under 35 U.S.C. 154(b) by 1610 days.

(21) Appl. No.: 12/340,260

(22) Filed: Dec. 19, 2008

(65) Prior Publication Data

US 2009/0159570 A1 Jun. 25, 2009

Related U.S. Application Data

(60) Provisional application No. 61/016,527, filed on Dec. 24, 2007.

(51) Int. Cl.
*B23K 11/14* (2006.01)
*B23K 11/00* (2006.01)
*B23K 11/30* (2006.01)

(52) U.S. Cl.
CPC .......... *B23K 11/14* (2013.01); *B23K 11/0053* (2013.01); *B23K 11/30* (2013.01)

(58) Field of Classification Search
CPC ..... B23K 11/0053; B23K 11/14; B23K 11/30; B23K 11/3063; B23K 11/3072
USPC ................ 219/119, 86.1, 86.25, 86.8, 93–94
See application file for complete search history.

(56) References Cited

U.S. PATENT DOCUMENTS

| 2,470,552 | A | * | 5/1949 | Gottschalk | 219/86.25 |
| 3,134,883 | A | * | 5/1964 | Moreland et al. | 219/119 |
| 3,238,352 | A | * | 3/1966 | Kollmann et al. | 219/119 |
| 3,657,509 | A | * | 4/1972 | Beneteau | B23K 35/0205 219/120 |
| 4,020,316 | A | * | 4/1977 | Schaft | B23K 11/0053 219/103 |
| 4,609,805 | A | * | 9/1986 | Tobita et al. | 219/93 |
| 4,947,019 | A | * | 8/1990 | Akiyama et al. | 219/119 |
| 6,624,379 | B1 | * | 9/2003 | Thornton et al. | 219/93 |

FOREIGN PATENT DOCUMENTS

| DE | 10209492 A1 | * | 10/2003 | B23K 11/004 |
| WO | WO-02074483 A1 | * | 9/2002 | B23K 11/0053 |
| WO | WO 2008144873 A1 | * | 12/2008 | |

* cited by examiner

*Primary Examiner* — Kevin E Yoon
*Assistant Examiner* — Jacky Yuen
(74) *Attorney, Agent, or Firm* — Womble Bond Dickinson (US) LLP

(57) ABSTRACT

An electrode for the projection welding of a weld nut to a workpiece has an electrode welding head with parts including a replaceable welding interface disc fitted therein. The electrode can be disassembled so that the conductive electrode interface within the welding head may be replaced when it becomes worn.

22 Claims, 4 Drawing Sheets

PROJECTION WELDING ELECTRODE WITH REPLACEABLE ELECTRODE ELEMENT

This application claims the benefit of U.S. Provisional Application No. 61/016,527 filed Dec. 24, 2007.

FIELD OF THE INVENTION

The present invention relates generally to the art of projection welding. More specifically, it applies to a welding head used during projection welding to attach a fastener such as a weld nut, a stud or similar item to a work part. The present invention specifically addresses a configuration by which worn parts in such a welding head may be readily replaced.

BACKGROUND TO THE INVENTION

Projection welding is a resistance welding process which uses heat obtained from resistance to a high electrical current through the work parts held together under pressure by electrodes to effect welding. In so doing a coalescence or welding of the metals is obtained. In spot welding, the size and position of the welds are determined by the size of the electrode tip and the contact point on the workpieces. In projection welding the size and position of the weld or welds are determined by the design of the component to be welded. The welding current and applied force are concentrated in a small, concentrated contact interface formed between the parts to be welded.

In one application of projection welding special nuts, called "weld nuts", are employed that have projections on the portion of the weld nut to be welded to the sheet metal, also known as the substrate or work piece. The use of projections formed on one face of a pilot nut ensures that a much higher current density is achieved within the small projections, so that the projections are raised to a temperature whereat the metal liquefies. In combination with the pressure from the electrodes sandwiching the nut and substrate together, this causes a strong weld by which the nut is permanently fixed to the substrate.

Weld nuts come in two types. Weld nuts with a protruding cylinder or pilot ring, known as "self-piloted" or "piloted nuts", are self-aligning to a hole in a work piece into which the piloting ring is fitted. A piloted weld nut has generally a flat, annular side surface on one end and on the other end, a parallel, peripheral, annular outer surface surrounding an inner protruding central cylinder that serves as a pilot ring. The pilot ring is topped by its own flat, annular, pilot ring end face. The annular outer surface surrounding the pilot ring carries the protrusions where welding is to occur.

Non-piloted weld nuts lack the annular pilot ring but otherwise include the protrusions that are necessary for welding. Studs may also be welded to workpiece by resistance welding. While the balance of this disclosure is directed to weld nuts as an example, the invention is equally applicable to the welding of any form of faster and the like to a workpiece.

In carrying-out the welding process a weld nut is held against a metallic work piece, typically at a point where a hole has been formed in the work piece, by a welding electrode head. For purposes of discussion this may be referred to as the "active" electrode, although it is characterized electrically only by the fact that it contacts the weld nut directly. A weld nut can be placed either on the topside surface of the workpiece or on the underside surface of the workpiece. On the other side of the work piece opposite to the location of the nut, a "counter-electrode" completes the electrical circuit to effect the weld. The key objective is to cause the welding current to flow through the weld nut and across the points of its protrusions into the workpiece, so that resistive heating will melt the protrusions and fuse their material with that of the workpiece.

A weld nut must be properly aligned in order to be properly welded to the work piece. To assist in locating the nut with respect to the electrode head, and in locating both the head and nut with respect to a hole formed in a work piece, one of the two electrodes generally contains a centrally mounted alignment pin. This pin passes through the center of an electrode and is generally insulated from the electrode itself by a non-conductive sleeve lining a central bore through the core of the body of the electrode. The electrical isolation of the pin prevents arcing between the tip of the pin in the workpiece and/or a weld nut. Such pins often are arranged to slide within the core of the electrode, permitting them to be advanced for alignment and withdrawn at the moment of welding.

Most typically, this alignment pin is present on the lower of the two electrodes, even in cases where the nut is applied to the workpiece on the topside surface of the workpiece. In this case, the alignment pin extends through the hole formed in the workpiece to penetrate through the hole in the weld nut and assists in the alignment process.

In the past, both active and counter-electrodes have generally been formed of a single, unitary piece. Both such electrodes have been shaped to provide a current-delivery interface at one end that is generally annular in shape. The central opening in this annular shape is occupied by the alignment pin in the case of an active electrode that is placed on the underside of the workpiece, and is penetrated by the tip of the alignment pin in the case of a counter-electrode placed on the upper side of the workpiece. When the active electrode is on the upper side of the workpiece, the alignment pin extends upwardly through a central bore in the counter-electrode and through the hole in the workpiece to penetrate through the open annular central region of the active electrode.

Such prior art active and counter-electrodes have generally been formed of unitary parts made of solid copper. When the annular current delivery interfaces of such electrodes become worn, they must be replaced. Wear at the electrode interface occurs as a result of the vaporization of copper due to arcing. This can form annular grooves in the surface of the annular electrode interface. At a certain stage, such grooves interfere with reliable welding and the electrode heads of the prior art design have to be replaced. As such heads are generally massive, machined to a specific shape and made of copper, the replacement cost is significant.

It would be desirable to provide an improved welding head that can accommodate wear without incurring the full cost of replacing the traditional welding head. This invention addresses that objective.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims that conclude this Specification.

SUMMARY OF THE INVENTION

According to one feature of the invention, an electrode welding head for a projection welding system is provided in the form of multiple parts wherein the conducting interface for the electrode head is provided by a replaceable part, typically in the form of a replaceable electrode interface disc. This disc carries the conductive interface surface, preferably annular in shape, which serves as the current delivery interface of the electrode head. Its role is to serve as an electrode interface through which the welding current is passed when a fastener, e.g. a weld nut, is successfully engaged by an electrode head when the fastener is in its proper location and with a correct orientation towards the workpiece to which it is to be welded.

More particularly, a welding head according to the invention has a body supporting the replaceable interface disc on its side opposite the welding interface and a containment member, typically and preferably with a central annular opening that surrounds and positions the disk against the electrode body. The containment member is removably coupled to the body of the welding head for easy replacement of the interface disc.

Preferably, this containment member overlies at least portions of the outer edge of the replaceable disc. The outer circumferential edge of the replaceable interface disc may be beveled, stepped or otherwise shaped in order to provide a portion of the discs circumference which will underlie the inner circumferential boundary of the central opening in the containment member. A portion of the disc providing the electrode interface may protrude through this central opening.

Most conveniently this replaceable conductive disc is made of copper or other high conductivity material such as metal or blend of metals.

Optionally, all of these members of the electrode head may be conductive, as being made of copper. Alternately the containment member may be non-conductive and preferably, in such case, is formed as a steel body insulated with a non-conductive material, as by being covered with a ceramic coating. A containment member made of steel with a durable insulative coating will serve to protect the electrode head from collisions in the course of its manipulation and reduce the risk of inadvertent shorting of the welding circuit.

The containment member may be threaded, optionally with a female thread so as to be engageable with a male thread carried by the body of the electrode head. Both the containment member and the body of the electrode head may carry flattened surfaces to assist in the engagement of this threaded connection. Thus a pair of opposed flats may be cut into the threads for gripping the threaded part while the electrode head is assembled. The containment member itself may have the outward appearance of a hexagonal nut with the same objective. The replaceable interface disc can thereby be compressed between the body and the overlying portion of the containment member by tightening this threaded coupling. When the body part is made of electrically conductive material as part of the electrical circuit, as is preferred, this form of threaded engagement can serve to draw the replaceable interface disc into tight physical and electrical connection with the body and thereby provide an efficient solid conductive path for delivering current to the replaceable interface disc.

Preferably, the containment member provides an annular face surface which is intended to be directed towards the workpiece and the interface surface of the replaceable welding disc protrudes slightly above the plane of this containment member face surface. This accommodates wear of the replaceable disc and reduces the prospect that a portion of the containment member's annular face surface may inadvertently contact a weld nut due to the presence of such wear of the replaceable disc. Optionally and alternately, the interface surface on the replaceable disc may be recessed within and behind the face surface of the containment member. In such case, it may be particularly desirable that the containment member either be made of a non-conductive material, or be provided with a non-conductive coating to insulate the containment member from the welding circuit.

The central region in the replaceable interface disc is generally preferably open to receive a portion of an alignment pin. In the case of an upper electrode, the tip of such an alignment pin will generally extend into a well or recess in the body part of the electrode head located beneath the central opening in the interface disc. In the case of a lower electrode, the alignment pin will generally extend through the bore formed in the central core of the body part, and be slidingly fitted therein.

An insulating sleeve in the form of a hollow cylinder may be fitted within this bore to guide the sliding motion of the alignment pin and isolate the alignment pin electrically from the welding circuit. The inner insulating sleeve may be held within the assembly of the electrode head by the combination of a protruding rim formed on the outside of the sleeve and a rim-receiving ledge formed on the inside face of the bore formed through the principal body of the electrode head. Preferably, the work-piece end of the insulating sleeve terminates within the body just short of the interface disc to ensure that this insulated part does not interfere with the solid, conductive, contact between the interface disc and the body.

However, when an alignment pin is not present in the electrode head, the body of the electrode head need not have a central bore or be provided with a recess.

A principal advantage of the invention is that when the replaceable electrode interface becomes worn, the electrode head may be disassembled by uncoupling, e.g. unthreading, the outer containment member from the inner body, and simply removing and replacing the copper electrode interface disc, which will generally be the only worn part. Such an arrangement represents a considerable saving over the use of unitary prior art electrode heads.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

FIG. 4 is an exploded cross-sectional assembly view of an electrode welding head without an alignment pin having, according to the invention, a replaceable electrode interface disc with a central opening which may be penetrated by the advancing tip of an alignment pin there through.

DESCRIPTION OF THE PREFERRED EMBODIMENT

Figure 1:
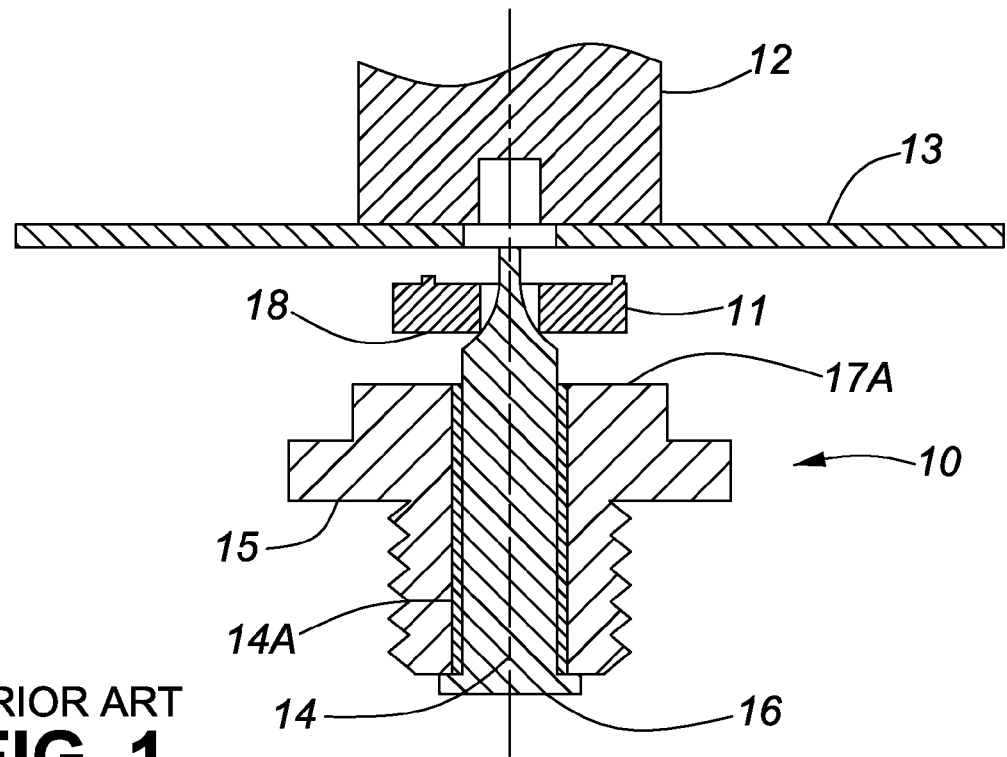
FIG. 1 is an assembled cross-sectional side view of a one-piece, prior art, lower, active electrode positioned against a weld nut located on the underside of the workpiece to which it is to be welded with a sliding alignment pin present within the lower active electrode and a one-piece, prior art, upper counter-electrode located on the upper side of the workpiece.

FIG. 1 is an assembled cross-sectional side view of a one-piece, prior art, lower, active electrode 10 positioned against a weld nut 11 located on the underside of the workpiece 13 to which it is to be welded with a sliding alignment pin 16 present within the lower active electrode and a one-piece, prior art, upper counter-electrode 12 located on the upper side of the workpiece 13.

The lower electrode body 15 is made of a unitary part of highly conductive material. In this prior art invention, the alignment pin 16 slides up within the lower electrode and serves to locate the weld nut and keep it in a position for welding. Welding current is ideally delivered through the annular current-delivery interface of the lower electrode body's upper face 17A and the weld nut's face 18.

Figure 2:
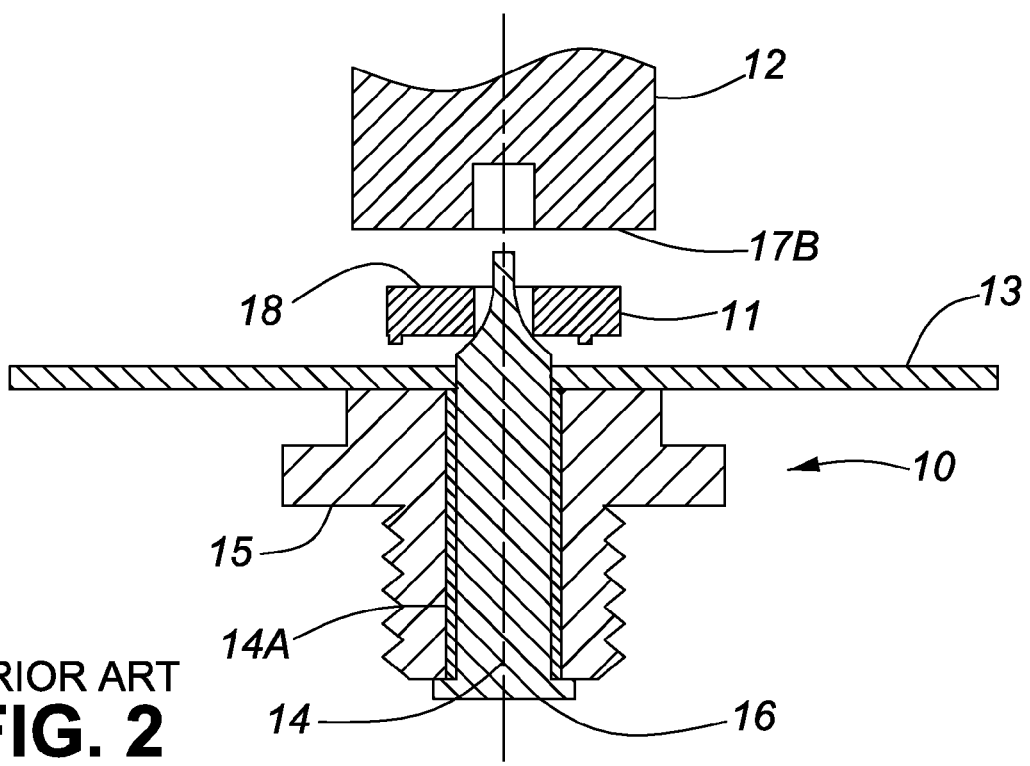
FIG. 2 is a variant on FIG. 1 depicting an assembled cross-sectional side view of a one-piece, prior art, upper, active electrode positioned against a weld nut located on the upper side of the workpiece to which it is to be welded and a one-piece, prior art, lower counter-electrode on the lower side of the workpiece with a sliding alignment pin present within the lower counter-electrode.

FIG. 2 is an alternate variant of FIG. 1 wherein the upper electrode 12 is the active electrode and is positioned against a weld nut 11 located on the upper side of the workpiece 13 to which it is to be welded. A one-piece, prior art, lower counter-electrode 10 is positioned on the lower side of the workpiece 13 with a sliding alignment pin 16 present within the lower counter-electrode. The upper electrode body 12 is also made of a unitary part of highly conductive material as with the lower electrode 10 in FIG. 1. The depiction of this upper electrode body 12 is schematic in that this electrode may also have a more complex form, similar to the counter-electrode 10.

In this prior art invention, the alignment pin 16 slides up and penetrates through the workpiece 13 via a bore in the workpiece where the weld nut 11 is intended to be welded. The positioning of the alignment pin 16 may be effected by the application of air pressure applied through parts into which the electrode 10 is fitted (not shown). This mechanism may include a small hole drilled through the support structure of the electrode holder (not shown) which carries the body 15. This air hole serves to introduce air pressure from beneath the base of the alignment pin 16, effecting its advancement and resiliently pushing the pin upwardly to its most upwardly advanced position. In the absence of such air pressure, the pin will generally drop down under gravity. The bore 14 is fitted with a non-conductive lining sleeve 14A to electrically isolate the alignment pin 16 from the welding current. This alignment pin 16 when advanced penetrates weld nut 11 in order to keep it in position during welding. Welding current is ideally delivered through the annular current-delivery interface of the upper electrode body's lower face 17B and the weld nut's face 18.

Figure 3:
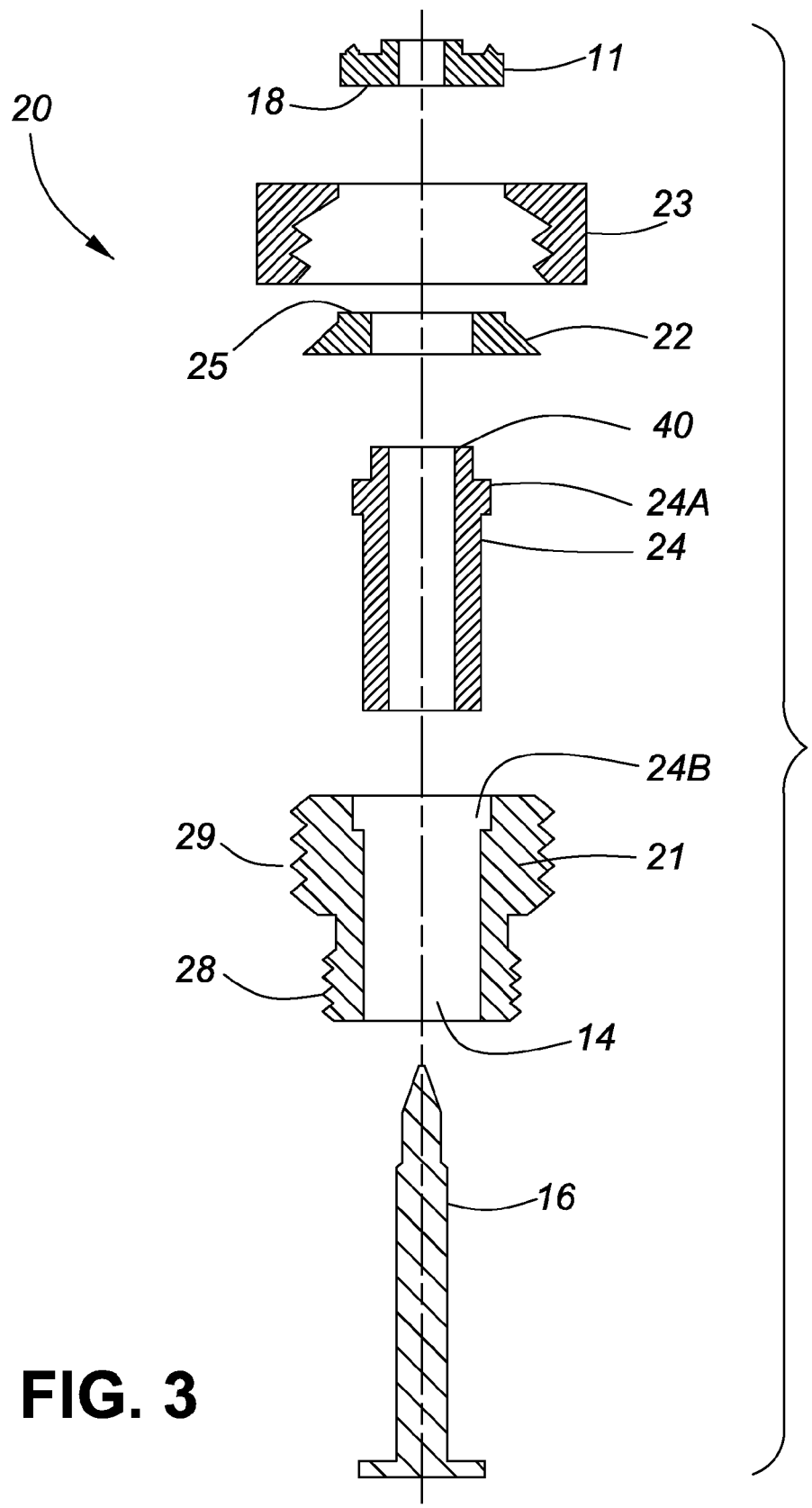
FIG. 3 is an exploded cross-sectional assembly view of an electrode welding head according to the invention having a replaceable electrode interface disc penetrated by an alignment pin slideably mounted within the body portion of the electrode head.

FIG. 3 is an exploded cross-sectional assembly view of an electrode welding head 20 according to the invention. The electrode head has a replaceable electrode interface disc, 22, which is made of a conductive material. The electrode interface disc 22 therefore serves as the annular current-delivery interface of FIGS. 1 and 2 and delivers current to the weld nut 11 via the contact of the interface disc's face 25 and the weld nut's face 18.

The electrode head 20 is penetrated by an alignment pin 16 as in FIGS. 1 and 2. Also as in FIGS. 1 and 2, the alignment pin 16 is slideably mounted within the body portion 21 of the electrode head 20 in the insulated sleeve 24. The body portion 21 contains a set of threads 28 for affixing the electrode head 20 to a welding machine. The body portion 21 contains a further set of threads 29 in order to affix a containment member 23 to the body portion 21. This containment member 23 holds the replaceable electrode interface disc 22 in contact with the electrode body 21. In this manner welding current is delivered from the welding machine, through the electrode body 21, to the interface disc 22 to weld the weld nut 11 to the workpiece.

The insulated sleeve 24 is inserted within the body portion 21 in order to minimize arcing of the welding current between the alignment pin 16 and the weld nut 11 in cases where the alignment pin 16 is formed of electrically conductive material. Alternately, the alignment pin 16 may be provided with an insulated coating, as, for example, a ceramic coating over steel. The inner insulating sleeve 24 is held within the assembly of the electrode head 20 by the combination of a protruding rim 24A formed on the outside of the sleeve 24 and a rim-receiving ledge 24B formed on the inside face of the bore 14 formed through the principal body of the electrode head.

The rim 24A on the insulating sleeve 24 has a workpiece facing end 40 and said end terminates within the electrode body 21 and replaceable interface disk 22 just short of the disc face 25 of the interface disc 22 to ensure that the insulated sleeve 24 does not interfere with the solid, conductive, contact between the interface disc 22 and the nut 11.

Figure 4:
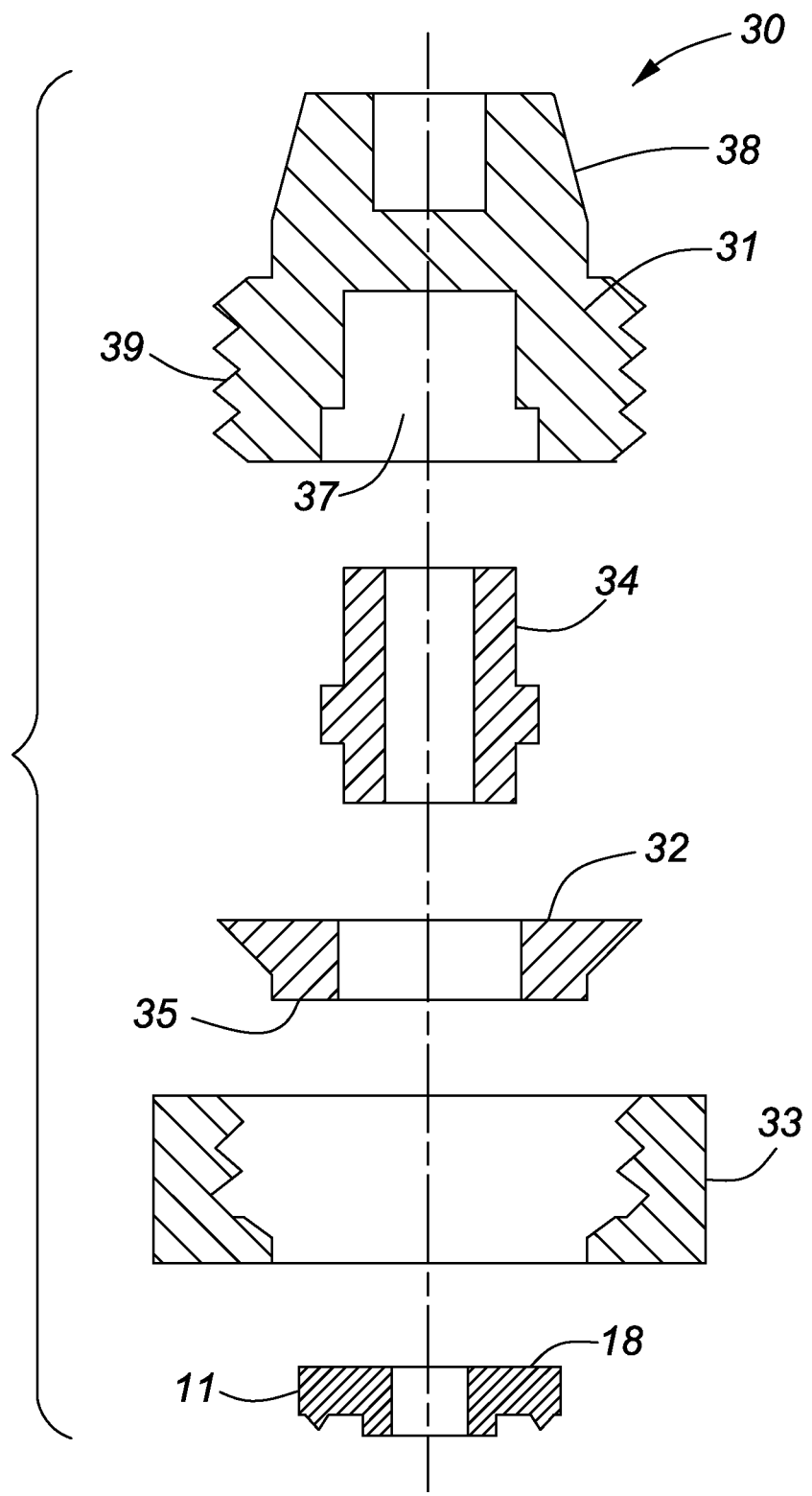

FIG. 4 is an exploded cross-sectional assembly view of an active upper electrode welding head 30 that, unlike FIG. 3, does not have an alignment pin. This upper electrode head 30 has, according to the invention, a replaceable electrode interface disc 32 with an optional central opening, such that the advancing tip of an alignment pin 16 can penetrate therethrough. This alignment pin 16 would be part of the counter-electrode (not pictured in FIG. 4) and would advance upwards through the workpiece from the counter-electrode below. The replaceable electrode interface disc, 32, which is made of a conductive material, serves to provide the annular current-delivery interface as an FIGS. 1 and 2 as it delivers current to the weld nut via the contact of the interface disc's face 35 and the weld nut's face 18.

The body portion 31 of the electrode head of FIG. 4 may contain a taper 38 so that the electrode head 30 may be affixed to a welding machine. The body portion 31 contains a further set of threads 39 in order to affix a conductive sleeve 33 to the body portion 31. This conductive sleeve 33 holds the interface disc 32 in contact with the electrode body 31. In this manner welding current is delivered from the welding machine, to the electrode body 31, thence to the interface disc 32, and is then administered to the weld nut 11 through protruding end face 35, so as to effect a weld of the nut to the workpiece.

An insulated sleeve 34 may be inserted within the body portion 31 in order to minimize arcing of the welding current between the alignment pin 16 advancing upwardly from a lower counter-electrode and the body portion 31 when the alignment pin 16 penetrates the body portion 31. Insulating sleeve 34 is suitable when the alignment pin 16 is formed of electrically conductive material. Alternately, if the alignment pin 16 is non-conductive, the space occupied by insulated sleeve 34 may be integrally formed with the body portion 31 of this electrode 30

Figure 5:
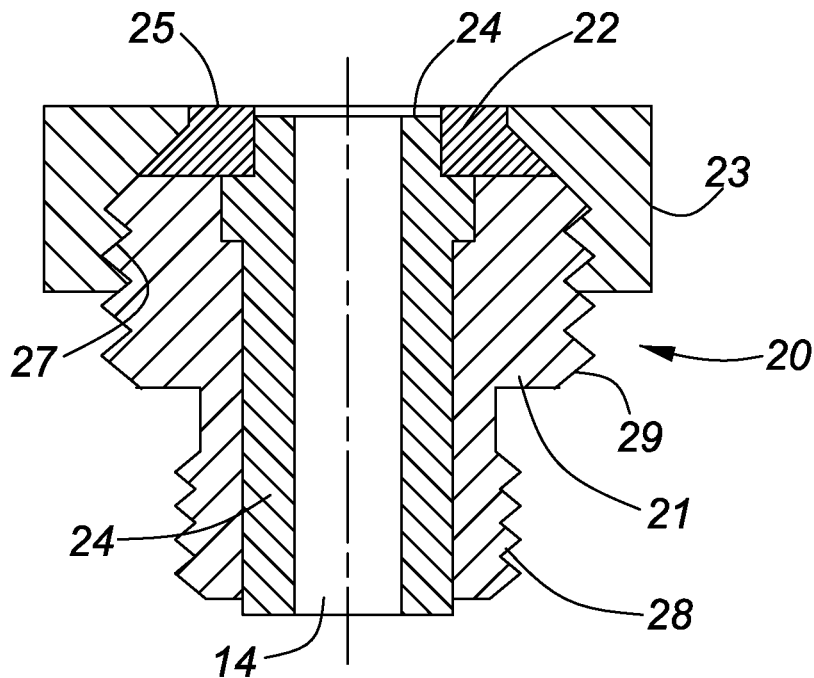
FIG. 5 is an assembled cross-sectional side view of the electrode head of FIG. 3.
Figure 6:
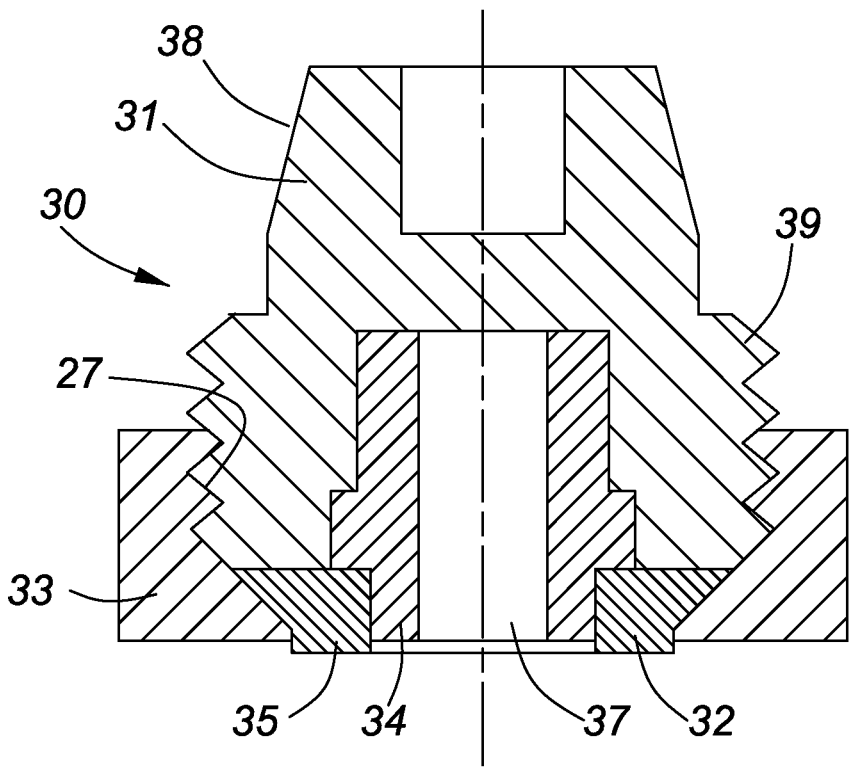
FIG. 6 is an assembled cross-sectional side view of the electrode head of FIG. 4.

The respective variants of the electrode welding head are shown assembled in FIGS. 5 and 6. FIG. 5 is an assembled cross-sectional side view of the electrode head of FIG. 3. The inside, female threads 27 of the containing member 23 in FIG. 5 mesh with the outer, male threads 29 of the body portion 21. The working face 25 of the interface disk 22 may protrude from the body 23, be flush with the top of the containing member 23 or, if the weld nut 11 is of a smaller diameter, be recessed within the body 23 to receive a weld nut 11 within a well. Not pictured for purposes of clarity is the alignment pin 16, which penetrates the central bore 14 of the body portion 21.

The annular current-delivery interface, face 25, located on the replaceable disc 22, juts out slightly from the containment member 23. The containment member 23 holds the replaceable disc 22 in a contacted position with the body portion 21 so that welding current may be delivered to the face 25 in order to effect a weldment. However, as the face 25 will wear in use, it is convenient for it to protrude typically by 5 to 15 thousandths of an inch.

FIG. 6 is an assembled cross-sectional side view of the electrode head of FIG. 4. The inside, female threads 27 of the containment member 33 mesh with the outer, male threads 39 of the body portion 31. The tip of an alignment pin 16 of a lower electrode would then penetrate the recess 37 of the body portion 31 and the optional insulated sleeve 34.

The annular current-delivery interface, face 35, located on the replaceable disc 32, preferably juts out from the containment member 33 by a slight degree in the same manner as referenced previously. The containment member 33 holds the replaceable disc 32 in a contacted position with the body portion 31 so that welding current may be delivered to the face 35 in order to effect a weldment.

CONCLUSION

The foregoing has constituted a description of specific embodiments showing how the invention may be applied and put into use. These embodiments are only exemplary. The invention in its broadest, and more specific aspects is further described and defined in the claims, which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A resistance projection welding electrode head for welding a workpiece to another object, said resistance projection welding electrode head comprising:
   a body, a containment member, a replaceable electrode disc, and an insulation member;
   said body having a bore passing therethrough, said bore defining an accommodation for said insulation member;
   said bore having a seat for said insulation member, said seat inhibiting axial motion of said insulation member;
   said insulation member having a passage formed therein to accommodate axial reciprocation of a workpiece alignment pin;
   said replaceable electrode disc having a clearance opening to permit reciprocation of the workpiece alignment pin, and, as assembled, the insulation member preventing contact of the alignment pin and the electrode disc;
   said replaceable electrode disc having a first side having a surface, said surface being a conductive welding surface with which to contact the workpiece, thereby to deliver current thereto;
   said replaceable electrode disc having a second side, said second side being opposite said first side;
   said containment member and said body being mutually releasably engageable;
   as assembled, said containment member at least partially surrounding said replaceable electrode disc, to thereby releasably capture said replaceable electrode disc with said conductive welding surface exposed;
   as assembled said second side of said replaceable electrode disc being supported by and in electrically conductive connection with said body, and when said replaceable electrode disc is mated to said body the insulator being captured in the seat between said replaceable electrode disc and said body; and
   said containment member being releasable to permit said replaceable electrode disc to be removed and replaced with another replaceable electrode disc.

2. The welding electrode head of claim 1 wherein said containment member has an opening defined therewithin, and said opening within the containment member has an inner circumferential boundary that overlies at least an edge portion of the replaceable electrode disc.

3. The welding electrode head of claim 2 wherein the replaceable electrode disc has an outer, circumferential edge that is relieved to underlie said inner circumferential boundary of said containment member.

4. The projection welding electrode head of claim 2 wherein the body is electrically conductive and the containment member is threadably engageable with the body, and, when assembled, the replaceable electrode disc is compressed against the body, between the body and the overlying portion of the containment member.

5. The projection welding electrode head as in claim 1 wherein the containment member is electrically non-conductive.

6. The projection welding electrode head of claim 4 wherein the containment member is formed of a conductive material; said containment member has an end that, when assembled, faces toward the workpiece; and said workpiece facing end is electrically insulated with a non-conductive coating.

7. The projection welding electrode head of claim 1 wherein the containment member has an annular face surface directed towards the workpiece and the conductive welding surface of the replaceable electrode disc protrudes beyond said containment member face surface.

8. The projection welding electrode head of claim 1 wherein the containment member is electrically non-conductive and has an outer annular face surface facing toward the workpiece, such outer annular face surface having a central recess formed therein, and said surface of the replaceable electrode disc is positioned at the base of this recess.

9. The projection welding electrode head of claim 1 wherein said replaceable electrode disc has a central region having a central opening formed therein defining said clearance opening accommodating axial reciprocation of the alignment pin.

10. The projection welding electrode head of claim 9 further comprising the alignment pin slidingly fitted within said bore and positioned so that the tip of such alignment pin may be advanced through the central opening in the replaceable electrode disc.

11. The projection welding electrode head of claim 10 wherein said insulating member is an insulating sleeve in the form of a hollow cylinder, said insulating sleeve defining the insulating member, said insulated sleeve being fitted within the bore to isolate the alignment pin electrically from said replaceable electrode disc.

12. The projection welding electrode head of claim 11 wherein the insulating sleeve is held within the seat of the electrode head by combining a protruding rim formed on the outside of the sleeve and a rim-receiving ledge formed on an inside face of the bore of said body of the electrode head.

13. The projection welding electrode head of claim 12 wherein the insulating sleeve has a workpiece end and said workpiece end terminates within the body just short of the interface disc said surface of said first side of said replaceable electrode disc to ensure that the insulating sleeve does not interfere with conductive contact between the replaceable electrode disc and the body.

14. The welding electrode head of claim 1 wherein the replaceable electrode disc is annularly-shaped to permit passage of a portion of the alignment pin therethrough.

15. A resistance welding electrode head assembly, comprising:
a first member, a second member and a third member;
said first member having an electrically conductive body having a bore formed therethrough to receive an electrical insulator;
said electrical insulator having a passageway formed therethrough in which to accommodate axial reciprocation of an alignment member;
said body having a seat for said insulator, said seat inhibiting axial displacement of said insulator;
said second member defining a retainer opposed to said electrically conductive body;
said third member defining a replaceable welding electrode member, said replaceable welding electrode member having a first portion for placement in electrical contact with said electrically conductive body; as assembled, the insulator is captured between said replaceable welding electrode member and said body said replaceable welding electrode member having a second portion opposed to said first portion, said second portion presenting a face for contacting a work piece to be welded;
said replaceable welding electrode member having an accommodation therein to permit axial reciprocation of an end of the alignment member;
said second member being releasably engageable to secure said replaceable welding electrode member in electrical contact against said electrically conductive body; and
as so engaged, said second member leaving said face of said second portion of said replaceable welding electrode member exposed to the work piece.

16. The resistance welding electrode head assembly of claim 15 wherein said second member is electrically conductive, and, when engaged, said first and second members both provide electrical current conduction paths to said replaceable welding electrode member.

17. The resistance welding electrode head assembly of claim 15 wherein said first member and said second member are mutually threadingly engageable.

18. The resistance welding electrode head assembly of claim 15 wherein, as assembled, said first portion of said replaceable electrode member extends away from said body and protrudes axially beyond said retainer.

19. The resistance welding electrode head assembly of claim 15 wherein said replaceable electrode member has the form of an annular disc.

20. The resistance welding electrode head assembly of claim 19 wherein said annular disc has a beveled outer periphery, and, as assembled, said beveled periphery is engaged by said retainer.

21. The resistance welding electrode head assembly of claim 15 wherein said bore of said body has a countersunk shoulder facing toward said replaceable electrode member, said shoulder defining said seat for the insulator.

22. The resistance welding electrode of claim 15 wherein said retainer is formed of an electrically conductive material; said retainer has an end that, when assembled, faces toward the workpiece; and said workpiece facing end is electrically insulated with a non-conductive coating.

* * * * *